United States Patent [19]
McCormick

[11] Patent Number: 5,811,674
[45] Date of Patent: Sep. 22, 1998

[54] COOLANT SAFETY SYSTEM FOR WELDING APPARATUS

[75] Inventor: Peter McCormick, Dallas, Tex.

[73] Assignee: EOA Systems, Inc., Dallas, Tex.

[21] Appl. No.: 886,770

[22] Filed: Jul. 2, 1997

Related U.S. Application Data

[63] Continuation of Ser. No. 557,835, Nov. 14, 1995, abandoned.

[51] Int. Cl.[6] ....................................................... G01F 7/00
[52] U.S. Cl. ......................... 73/196; 73/197; 73/861.44
[58] Field of Search ............................... 73/195, 196, 198, 73/827, 861.44

[56] References Cited

U.S. PATENT DOCUMENTS

| | | | |
|---|---|---|---|
| 3,571,556 | 3/1971 | Wustner | 219/121 |
| 3,664,357 | 5/1972 | Kreiss | 73/196 |
| 4,742,841 | 5/1988 | Vonderhaar et al. | 137/115 |
| 4,864,099 | 9/1989 | Cusick, III et al. | 219/137.62 |
| 5,226,471 | 7/1993 | Stefani | 165/34 |

OTHER PUBLICATIONS

"Norco Water Control valve" excerpt, date and author unknown.
"Turck Flow Monitors" excerpt, date and author unknown.
"Syndevco Water Control Valve 4400 Series" excerpt, date and author unknown.
"Electro–matic Cable Gun Water Control Drawings", date and author unknown.

*Primary Examiner*—George M. Dombroske
*Assistant Examiner*—Max H. Noori
*Attorney, Agent, or Firm*—Daniel V. Thompson

[57] ABSTRACT

In an automated welding machine, where a flow of liquid coolant is supplied to welding components on the machine from a source of coolant and then returned to the source of coolant, a safety system is provided that shuts down the flow of coolant in the event of a fault. Faults are detected by a supply sensor and a return sensor for measuring the flow rates of coolant in the supply and return lines. A microprocessor is adapted to compare the supply flow rate and return flow rate and detect differences between the two rates. The difference between the detected rates as compared to a leak threshold value, and the microprocessor is adapted to generate a valve shutoff signal in the event the detected difference in flow rates exceeds the leak threshold value. A valve in the supply coolant line is responsive to the valve shutoff signal to shutoff flow of coolant in response thereto.

5 Claims, 3 Drawing Sheets

COOLANT SAFETY SYSTEM FOR WELDING APPARATUS

This is a continuation of application Ser. No. 08/557,835 filed on Nov. 14, 1995 now abandoned.

TECHNICAL FIELD

This invention relates to automated welding apparatus, and more particularly to a device to detect coolant leakage and automatically shut off a coolant supply valve in response thereto.

BACKGROUND ART

Automated welding systems, either "hard" automated systems or robotic arms fitted with welding end-of-arm units, are now in common use in many types of manufacturing. The heat generated by automated welding systems is sufficiently great that a source of forced cooling is required. Typically, automated welding units are liquid-cooled, with coolant (typically water) being supplied from a source of pressurized coolant remote from the welding unit. In many installations, a large number of automated welding machines are plumbed to a common source of coolant liquid under pressure.

The typical coolant flow through an automated spot-welding gun, a common variant, is about six gallons per minute. The SCR weld control is typically supplied 1–2 gpm, the weld gun upper tip 1.5 gpm, weld gun lower tip 1.5 gpm, the shunts 1 gpm, and the cable 1.5 gpm. The usage of a liquid coolant with high-powered electrical equipment necessitates some sort of safety system to detect coolant leakage in the event of broken coolant lines or other failures in the coolant system. In addition, it is desirable to detect either excessive flow or insufficient flow conditions. An excessive flow condition can mean that coolant supply pressure has exceeded its design level or that a necessary restriction within the cooling system has been removed. Similarly, an insufficient flow condition can indicate a failure of the coolant supply or a general blockage of the coolant supply or return lines.

Present solutions to the requirement of sensing and monitoring coolant flow in automated welding arms have used complicated and expensive mechanical leakage detection devices. For example, a water control valve manufactured by Norco of Troy, Mich. relies on a complicated spool valve having opposed surfaces on opposite sides of the flow circuit to sense pressure imbalances. Numerous o-rings, diaphragms and moving parts make reliable operation of this device as questionable as the proper operation of the cooling system it is designed to protect. Thus, in addition to the expense of such a system, there are concerns about the maintenance and reliability of the prior art safety systems.

Thus, there presently exists a need for a coolant safety system for an automated welding machine that is simple, inexpensive and reliable with minimal maintenance requirements.

SUMMARY OF THE INVENTION

The present invention provides a coolant system safety device for an automated welding machine that combines electronic control by way of a microprocessor with flow level and leakage detection provided by inexpensive yet reliable differential pressure transmitters. An integral digital flow rate display is also provided.

BRIEF DESCRIPTION OF THE DRAWINGS

A more complete understanding of the invention and its advantages will be apparent from the Detailed Description taken in conjunction with the accompanying Drawings, in which.

DETAILED DESCRIPTION OF THE PREFERRED EMBODIMENT

Figure 1:
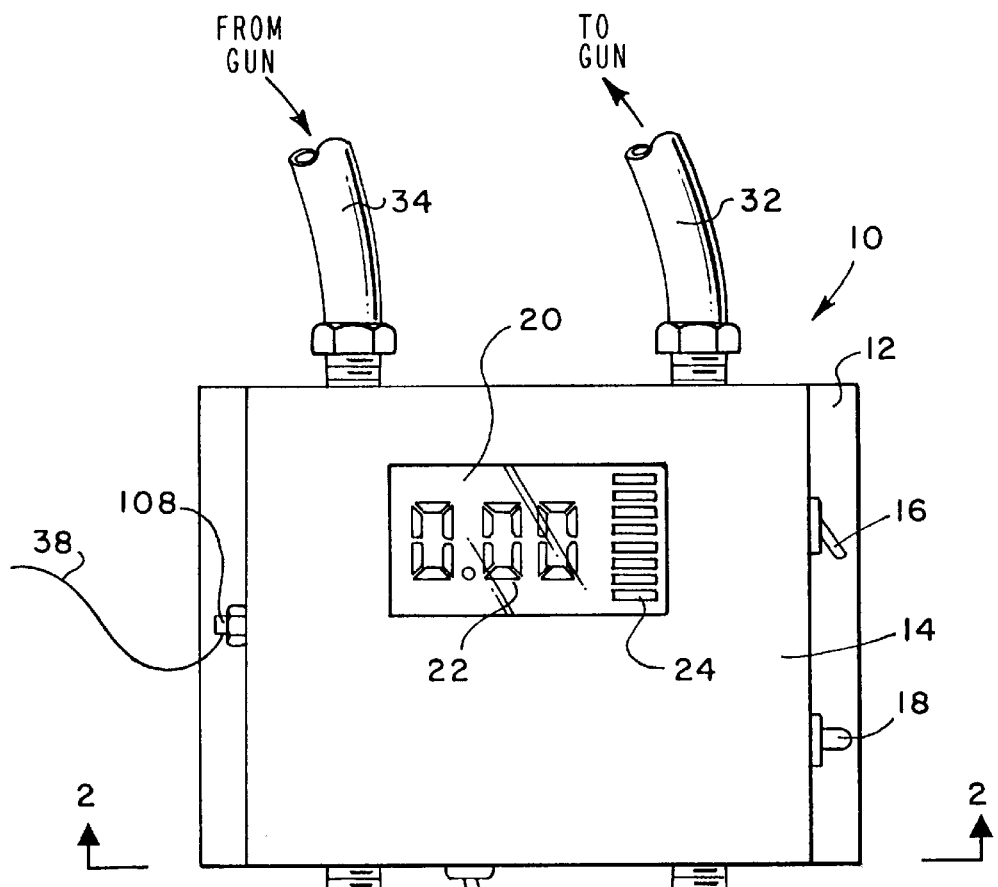
FIG. 1 is a top view of an apparatus constructed in accordance with the invention.
Figure 2:
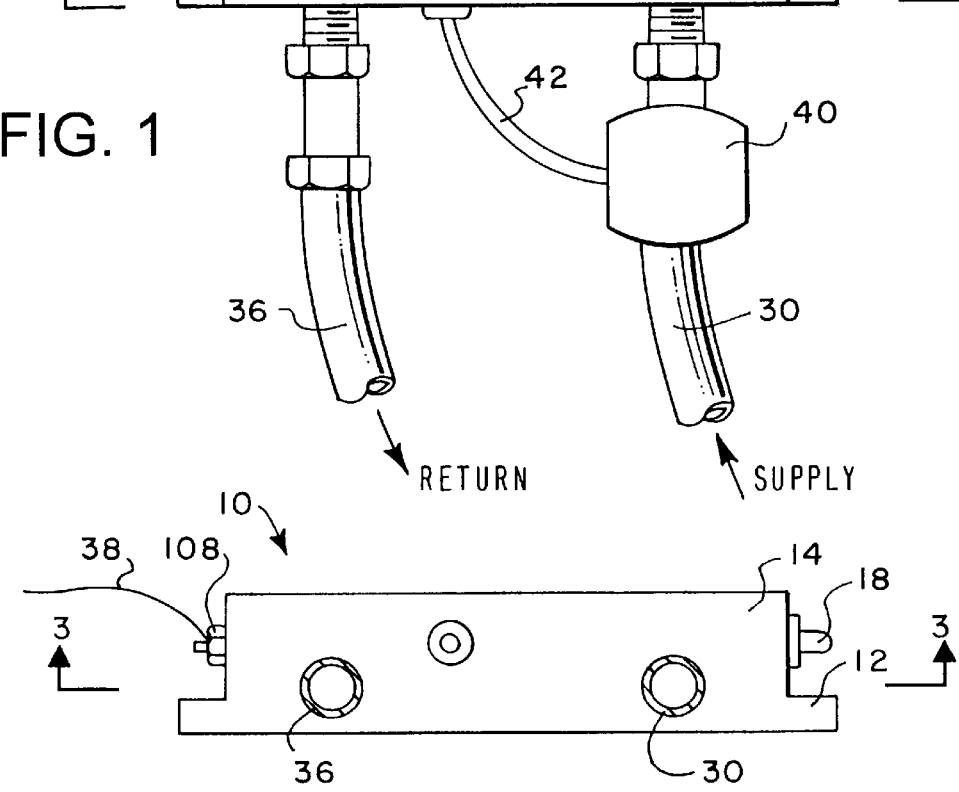
FIG. 2 is a sectional view taken along lines 2—2 of FIG. 1.
Figure 3:
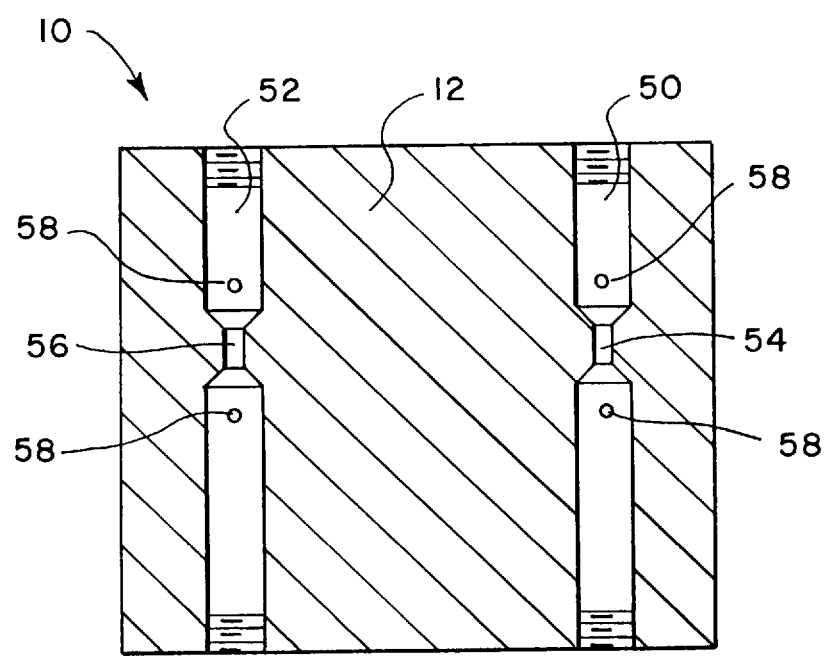
FIG. 3 is a sectional view taken along lines 3—3 of FIG. 2.

Referring initially to FIGS. 1–3, where like numerals refer to like and corresponding elements, safety system 10 includes a manifold 12 and an electronic module housing 14. A toggle switch 16 and a push button switch 18 extend from a side surface of housing 14. LED display 20 includes a three-digit numerical display 22 and an array 24 of single LEDs. The following description is applicable to a safety system in a robotic environment, but persons skilled in the art will recognize that the system is usable in "hard" automated systems with minor modifications.

Four coolant lines connect to manifold 12: coolant supply line 30, welding gun supply line 32, welding gun return line 34, and coolant return line 36. An electrical control cable 38 is plugged into a side of housing 14. Solenoid valve 40 is located in coolant supply line 30 close to system 10. A control cable 42 connects housing 14 and valve 40.

As best shown in FIG. 3, manifold 12 is machined to include a supply passageway 50 and a return passageway 52. Each passageway 50, 52 has an identically-sized orifice 54, 56, respectively. A port 58 is drilled into each side of orifices 54, 56, for a total of four ports 58. As will be known to one skilled in the art, the provision of a port 58 on each side of orifices 54 and 56 enables the precise measurement of differential pressure across the orifices 54, 56. Differential pressure across an orifice is a direct function of flow rate.

Figure 4:
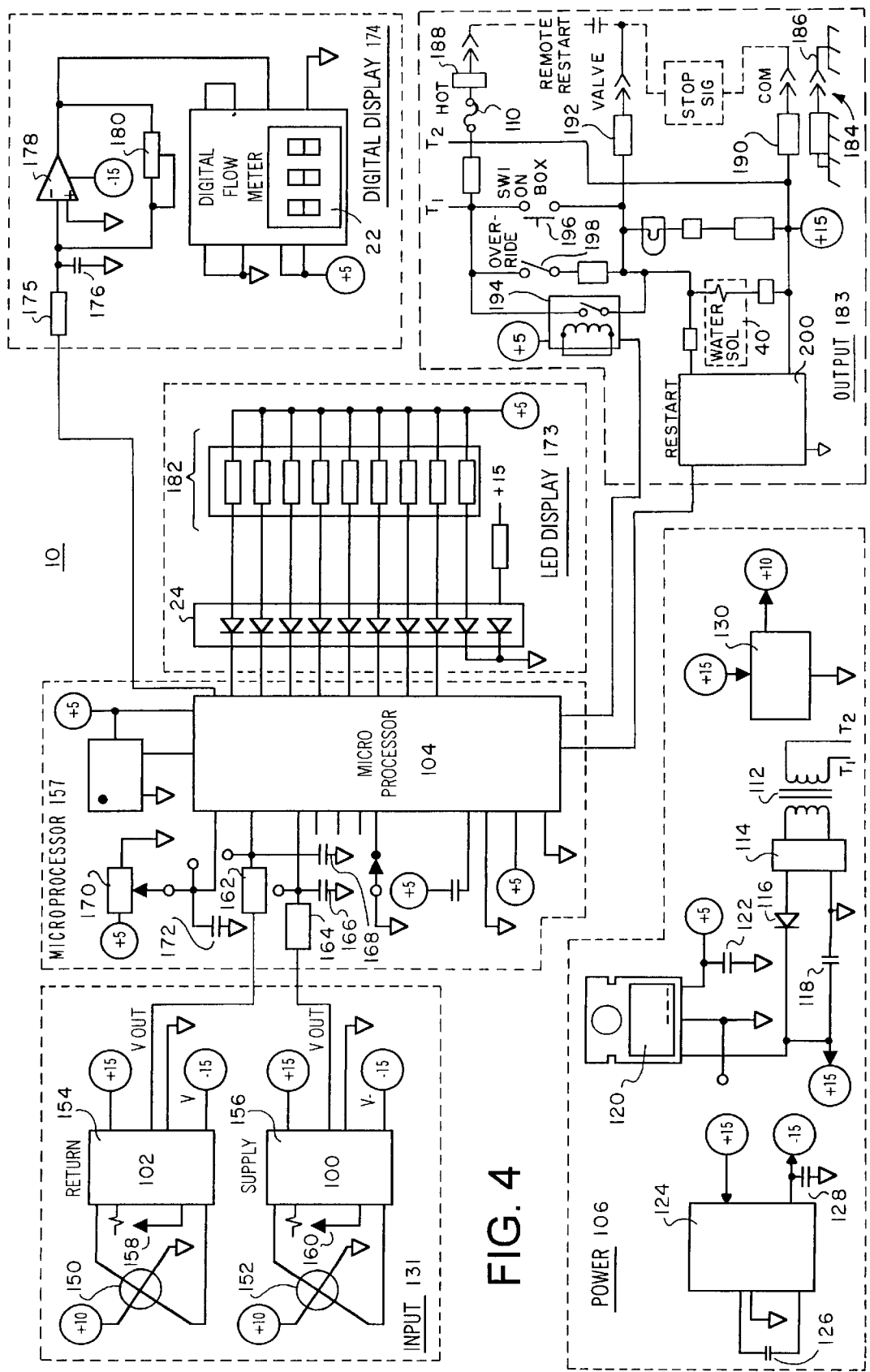
FIG. 4 is a circuit schematic.

Referring now to FIG. 4, safety system 10 measures the flow of water to and from the device being cooled, in this case an automated welding gun, using two differential pressure flow sensors 100, 102 that are constantly monitored by a microprocessor 104. In the preferred embodiment, coolant will be shut-off via electric solenoid valve 40 if one or more of the following conditions are met (all values may be adjusted in software or by gain pots):

(1) Flow exceeds approximately 7 g.p.m., (2) Flow is below approximately 1 g.p.m., or (3) Flow difference is greater than 0.5 g.p.m.

Power module 106 receives 120 VAC power or optional 24 VDC (through cable 38 and connector 108, FIGS. 1 and 2) through fuse 110 and transformer 112. Transformer 112 has two input leads $T_1$ and $T_2$. Transformer 112 is bypassed using jumpers if the application requires 24 VDC. The voltage is transformed to 20 VAC in transformer 112 and is fed into a full wave bridge rectifier 114. Diode 116 insures against reverse polarity. The rectified power is filtered into DC using capacitor 118 to generate 15 VDC. This power is used for the 15 VDC supplied to the op amps described below. 15 VDC is also regulated down to 5 VDC using regulator 120. Capacitor 122 provides additional filtering of the 5 VDC power. 15 VDC is fed to voltage inverter 124. Inverter 124 periodically charges capacitor 126, then uses the equivalent of an internal double pole switch to rapidly place capacitor 126's inverted voltage into capacitor 128. The voltage on capacitor 128 is therefore negative with respect to ground to provide the minus 15 VDC supply to the op amps described below. 15 VDC is also supplied to regulator 130 to regulate and supply the extremely stable and precise 10.000 volts for flow sensors 100,102. Regulator 130 in the preferred embodiment is a Harris voltage inverter Model No. ICL7662CPA.

The input module 131 of the circuit has the primary function of measuring the return and supply flow by way of sensors 100,102. In the preferred embodiment, differential pressure sensors are used in preference to other available methods for measuring flow. One alternative method of measuring flow, for example, uses the calorimetric principle, or the measure of heat transfer from an object to a fluid. This method, while highly accurate, is not preferred due to its prohibitive costs. Additional methods employ ultrasonic, vane, and impeller techniques for measuring flow. It will be recognized that these alternative methods are equivalent to the preferred method, though more costly.

Water flowing through an orifice normally follows the equation $Q=Cv\sqrt{(P_{IN}-P_{OUT})}$. Q is flow in gallons per minute, Cv is a constant, $P_{IN}$ is the pressure before the orifice and $P_{OUT}$ is the pressure after the orifice. Referring to FIG. 3, as well as FIG. 4, pressure sensors 150 and 152 each have two hose attachments which plumb into ports 58 in flow manifold 12. In flow manifold 12, passageways 50, 52 preferably have a mean diameter of 0.74 inches and an orifice 54, 56 diameter of 0.375 inches. Differential pressure is applied to opposing sides of a diaphragm within sensors 150,152 that has an "X" etched into the surface. Excitation current is passed longitudinally through the diaphragm, and the pressure that stresses the diaphragm is applied at a right angle to the current flow. The stress establishes a transverse electric field in the diaphragm, acting as a resistor, that is sensed as a voltage at the midpoint at the resistor. The single element transverse voltage strain gauge of sensors 150, 152 can be viewed as the mechanical analog of a Hall effect device. The device is temperature, gain, and zero compensated. In the preferred embodiment, the differential pressure sensors 150, 152 are each a model no. MPX2010D manufactured by Motorola.

A full flow differential pressure of no more than 1.5 psi results in a signal of 0.025 V on the output of sensors 150, 152. This small voltage is amplified in instrumentation op amps 154,156. Instrumentation op amps 154,156 are each a model no. INA114BP manufactured by Burr Brown. Gain is adjusted on resistors 158,160 so that the amps 154,156 output the same voltage when the flows are the same. The output of the amps 154,156 are low pass filtered for inherent slight cavitation pressure spikes in manifold 12 using resistors 162,164 and capacitors 166,168. The filtered 0–5 VDC raw voltages from the amps 154,156 are fed to microprocessor 104 for interpretation.

The microprocessor module 157 for the system uses a microprocessor 104, because it eliminates a much more complex hard-wired circuit and may be easily altered in software. Microprocessor 104 has internal ram/rom, several eight-bit analog inputs, the ability to output variable duty cycle square waves, and discreet inputs and outputs. In the preferred embodiment, microprocessor 104 is a Signetics model no. S87C752-1N28.

Since $Q=Cv\sqrt{(P_{IN}-P_{OUT})}$, and Cv is only important when scaling Q to units (English, Metric, etc.) the constant Cv is ignored for now. The supply $P_{IN}-P_{OUT}$ is the voltage from sensor 152 and op amp 156. The return $P_{IN}-P_{OUT}$ is the voltage from sensor 150 and op amp 154. Microprocessor 104 uses a look-up square root table twice to determine supply flow (S) and return flow (R). The difference in flow is S–R. A user-settable threshold trimpot 170 is stabilized by capacitor 172 and is fed directly to microprocessor 104 on an analog channel and compared with S–R. Coolant will be shut-off if the flow difference threshold is exceeded for a full two seconds. (S–R>T). Likewise flow is shut-off if flow exceeds approximately 7 g.p.m. (S or R>7 g.p.m.) or is lower than 1 g.p.m. (S or R<1 g.p.m.).

Microprocessor 104 includes a digital output port, which is used to directly drive LED display 24 in module 173 to keep the user informed of the system's status. The indicator lights in display 24 are a row of LEDs driven directly by the microprocessor 104. Dropping resistors 182 limit the drive current.

Microprocessor 104 also uses its variable duty cycle square wave PWM capability to notify the user of the actual flow rate using digital numeral display 22 in module 174. The PWM cycles at 20 KHz. As flow changes, the duty cycle changes. The 20 kHz is filtered to a DC level using a low pass filter comprised of resistor 175 and capacitor 176. Op amp 178 provides the Cv in the equation $Q=Cv\sqrt{(P_{IN}-P_{OUT})}$ to convert volts to a scaled, meaningful flow rate on the display 22. Resistor 180 is provided to adjust the amp gain to display Cv during factory calibration.

Digital display meter 22 provides the user with actual gallons per minute from both sensors 150, 152. Microprocessor 104 periodically changes between the supply and return flow data going to display 22. Indicator lights in LED display 24 tell the user which sensor the digital display 22 is currently reporting. The digital display is preferably a self-contained volt meter with 0–20 volt capability, model DMS-20PC-2RH manufactured by Datel. Amp 178 and gain resistor 180 scale the PWM signal from microprocessor 104 to make the volt meter represent the "gallons per minute" flowing through the selected sensor 150,152.

Microprocessor 104 uses the "supply g.p.m." or "return g.p.m." LEDs in display 24 to tell the user which flow sensor 150 or 152 is currently represented on the digital flow meter 22. A "flow not equal" LED is illuminated when unscaled S–R exceeds threshold T. LEDs labeled "low supply flow" or "low return flow" are lit when either sensor 150, 152 indicates flow is less than 1 g.p.m. Similarly, "high supply flow" or "high return flow" LEDs will light when either sensor 150, 152 indicates flow is more than 7 g.p.m. Microprocessor 104 will allow brief, intermittent faults caused by harmless conditions such as water hammering, pressure glitches, and rugged actual factory situations. However, the "stop LED" will turn on if any of the above conditions occur for a full two seconds. This fault condition will turn the coolant valve off, as described below.

In Output module 183, power is supplied to the system over a 4-pin connector 184. Wire 186 is chassis ground, wire 188 is hot, and wire 190 is common. Wire 192 performs a dual purpose: when wire 192 is attached to a robot control input relay, it will tell the robot when coolant is flowing when high; when wire 192 is off, coolant is off, and a call to maintenance signal will be made. Wire 192 should also be attached to a robot output relay. When briefly energized, the coolant valve 40 will be turned on and flow restored.

Mechanical relay 194 is normally on and is driven directly by microprocessor 104. Relay 194 provides power to the coolant solenoid 40 to keep it open. If a fault condition occurs, relay 194 opens and turns off solenoid valve 40. Momentary push button switch 196 temporarily provides power to solenoid valve 40 to allow water to flow again. If microprocessor 140 is satisfied that the problem has been solved, relay 194 stays closed to keep the valve 40 on when the user releases switch 196. Preferably, a light in switch 196 indicates to the user that the valve is operating properly. If there is a major circuit malfunction, the user may toggle locking override switch 198 to turn valve 40 on permanently and bypass system 10. As shown in FIGS. 1 and 2, push button switch 196 has a button 18 extending from housing 14, and override switch 198 has a toggle 16 extending from the housing 14.

Optoisolator 200 watches the status of coolant solenoid valve 40 and reports it to the microprocessor 104. When the user or robot attempts to restart coolant flow, the microprocessor 104 will give the flow sensors 150,152 "another chance" and will compare their values to see if a restart is justified. Microprocessor 104 will ignore a restart unless optoisolator 200 says to give another chance. After a shut down, microprocessor 104 will not inadvertently latch valve 40 on again unless the robot or user intentionally intends it by electrically turning valve 40 on.

In operation, leaks typically occur when a coolant line breaks or a welding gun tip breaks off. The shut-off valves currently in use employ mechanical or electronic means to measure the coolant flow to a welding gun. If shop water pressure changes, grunge builds up in welding gun tips or valves, hoses are not properly dressed for minimal flow restrictions, adjacent robots cause flow changes or a myriad of other problems occur, these prior art shut-off systems fail. The failure of prior art systems is mainly attributed to the fact that they only measure flow of coolant to the gun and jam under realistic dirty water conditions. The shut-off valve is typically "hair" triggered to shut-off water with about plus or minus 20% of the flow.

The present invention differs from the prior art in that flow is measured both to and from the welding gun, and the difference is compared to a preset leak threshold. Thus, the system is isolated from nonleak-related flow changes such as shop water pressure changes, which affect both supply and return flow rates. As a result, not only are false alarm shut-offs avoided, but the system monitors leakage throughout the entire cooling system due to an increased accuracy.

Whereas, the present invention has been described with respect to a specific embodiment thereof, it will be understood that various changes and modifications will be suggested to one skilled in the art and it is intended to encompass such changes and modifications as fall within the scope of the appended claims.

I claim:

1. In a welding machine, where a flow of liquid coolant is supplied to welding components on the machine from a source of coolant and then returned to the source of coolant, the improvement comprising:

a supply sensor for measuring the supply flow rate of coolant in a supply coolant line to welding components and generating an electrical signal representing the supply flow rate;

a return sensor for measuring the return flow rate of coolant in a return coolant line from the welding components and generating an electrical signal representing the return flow rate;

a microprocessor adapted to compare the supply flow rate to the welding components and return flow rate from the welding components and detect differences between said two rates, the microprocessor adapted to compare the detected differences to a leak threshold value, and the microprocessor adapted to generate a valve shutoff signal in the event a detected difference in flow rates exceeds the leak threshold value;

a valve in the supply coolant line responsive to the valve shutoff signal to shut off flow of coolant in response thereto;

where the microprocessor is adapted to compare one of the flow rates to a high threshold value and generate a valve shutoff signal in the event the detected flow rate exceeds the high threshold value;

where the microprocessor is adapted to compare one of the flow rates to a low threshold value and generate a valve shutoff signal in the event the detected flow rate is less than the low threshold value; and with a digital display for indicating at least one of the flow rates.

2. The apparatus of claim 1 where the supply sensor and return sensor each measure differential pressure across an orifice to determine flow rate.

3. The apparatus of claim 1 where the signals generated by the supply sensor and return sensor are proportional to the square root of the flow rate.

4. The apparatus of claim 1 where the microprocessor delays generation of the valve shutoff signal a predetermined time interval to prevent nuisance shutoffs.

5. In a welding machine, where a flow of liquid coolant is supplied to welding components on the machine from a source of coolant and then returned to the source of coolant, the improvement comprising:

a supply sensor for measuring the supply flow rate of coolant in a supply coolant line to welding components and generating an electrical signal representing the supply flow rate;

a return sensor for measuring the return flow rate of coolant in a return coolant line from the welding components and generating an electrical signal representing the return flow rate;

a microprocessor adapted to compare the supply flow rate to the welding components and return flow rate from the welding components and detect differences between said two rates, the microprocessor adapted to compare the detected differences to a leak threshold value, and the microprocessor adapted to generate a valve shutoff signal in the event a detected difference in flow rates exceeds the leak threshold value;

a valve in the supply coolant line responsive to the valve shutoff signal to shut off flow of coolant in response thereto;

where the microprocessor is adapted to compare one of the flow rates to a high threshold value and generate a valve shutoff signal in the event the detected flow rate exceeds the high threshold value;

where the microprocessor is adapted to compare one of the flow rates to a low threshold value and generate a valve shutoff signal in the event the detected flow rate is less than the low threshold value;

with a digital display for indicating at least one of the flow rates;

where the supply sensor and return sensor each measure differential pressure across an orifice to determine flow rate;

where the signals generated by the supply sensor and return sensor are proportional to the square root of the flow rate; and where the microprocessor delays generation of the valve shutoff signal a predetermined time interval to prevent nuisance shutoffs.

* * * * *